(12) United States Patent
Sun et al.

(10) Patent No.: US 9,523,765 B2
(45) Date of Patent: Dec. 20, 2016

(54) PIXEL-LEVEL OVERSAMPLING FOR A TIME OF FLIGHT 3D IMAGE SENSOR WITH DUAL RANGE MEASUREMENTS

(71) Applicant: OMNIVISION TECHNOLOGIES, INC., Santa Clara, CA (US)

(72) Inventors: Tianjia Sun, Santa Clara, CA (US); Rui Wang, San Jose, CA (US); Tiejun Dai, Santa Clara, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 361 days.

(21) Appl. No.: 14/330,212

(22) Filed: Jul. 14, 2014

(65) Prior Publication Data

US 2016/0010986 A1     Jan. 14, 2016

(51) Int. Cl.
| | |
|---|---|
| *G01C 3/08* | (2006.01) |
| *G01S 7/486* | (2006.01) |
| *G01S 17/10* | (2006.01) |
| *G01S 17/89* | (2006.01) |

(52) U.S. Cl.
CPC ............ *G01S 7/4865* (2013.01); *G01S 7/4863* (2013.01); *G01S 17/105* (2013.01); *G01S 17/89* (2013.01)

(58) Field of Classification Search
CPC ................................ G01S 17/105; G01S 17/89
USPC ....................................................... 356/5.01
See application file for complete search history.

(56) References Cited

U.S. PATENT DOCUMENTS

| | | | |
|---|---|---|---|
| 7,595,827 B2 * | 9/2009 | Sato | ............. H04N 5/335 348/294 |
| 8,274,037 B2 | 9/2012 | Ritter et al. | |
| 8,399,819 B2 | 3/2013 | Madhani et al. | |
| 8,482,722 B2 | 7/2013 | Min et al. | |
| 8,569,700 B2 | 10/2013 | Bikumandla | |

(Continued)

FOREIGN PATENT DOCUMENTS

| | | |
|---|---|---|
| CN | 102004254 A | 4/2011 |
| CN | 102379156 A | 3/2012 |
| TW | 201202731 A | 1/2012 |

OTHER PUBLICATIONS

TW Application No. 103136364—Taiwanese Office Action and Search Report, with English Translation, issued Oct. 5, 2015 (15 pages).

*Primary Examiner* — Mark Hellner
(74) *Attorney, Agent, or Firm* — Blakely Sokoloff Taylor & Zafman LLP

(57) ABSTRACT

A time of flight pixel cell includes a photosensor to sense photons reflected from an object. Pixel support circuitry including charging control logic is coupled to the photosensor to detect when the photosensor senses the photons reflected from the object, and coupled to receive timing signals representative of when light pulses are emitted from a light source. A controllable current source is coupled to receive a time of flight signal form the charging control logic to provide a charge current when a light pulse emitted from the light source until the photosensor senses a respective one of the photons reflected from the object. A capacitor is coupled to receive the charge current, and a voltage on the capacitor is representative of a round trip distance to the object. A reset circuit is coupled to reset the voltage on the capacitor after being charged a plurality number of times.

31 Claims, 7 Drawing Sheets

(56) References Cited

U.S. PATENT DOCUMENTS

| | | | |
|---|---|---|---|
| 8,642,938 B2* | 2/2014 | Bikumandla | H01L 27/14612 250/208.1 |
| 8,686,367 B2 | 4/2014 | Shah | |
| 2011/0157354 A1* | 6/2011 | Kawahito | G01S 7/4863 348/140 |
| 2013/0181119 A1* | 7/2013 | Bikumandla | H01L 27/14612 250/214.1 |
| 2013/0300838 A1 | 11/2013 | Borowski | |
| 2015/0276922 A1* | 10/2015 | Mase | G01S 7/4863 356/5.01 |

* cited by examiner

PIXEL-LEVEL OVERSAMPLING FOR A TIME OF FLIGHT 3D IMAGE SENSOR WITH DUAL RANGE MEASUREMENTS

BACKGROUND INFORMATION

Field of the Disclosure

This invention is related to image sensors. In particular, embodiments of the present invention are related to three dimensional image sensors.

Background

Interest in three dimensional (3D) cameras is increasing as the popularity 3D applications continues to grow in applications such as imaging, movies, games, computers, user interfaces, and the like. A typical passive way to create 3D images is to use multiple cameras to capture stereo or multiple images. Using the stereo images, objects in the images can be triangulated to create the 3D image. One disadvantage with this triangulation technique is that it is difficult to create 3D images using small devices because there must be a minimum separation distance between each camera in order to create the three dimensional images. In addition, this technique is complex and therefore requires significant computer processing power in order to create the 3D images in real time.

For applications that require the acquisition of 3D images in real time, active depth imaging systems based on the optical time of flight measurement are sometimes utilized. Time of flight systems typically employ a light source that directs light at an object, a sensor that detects the light that is reflected from the object, and a processing unit that calculates the distance to the object based on the round trip time that it takes for light to travel to and from an object. In typical time of flight sensors, photodiodes are often used because of the high transfer efficiency from the photo detection regions to the sensing nodes.

A continuing challenge with the acquisition of 3D images is that the required processing must occur very quickly in order for the 3D image acquisition system to resolve time differences on the order of, for example, 0.1 ns for real time applications. With such short response times required for real time applications, sensitivity to noise, jitter, clock signals, heat, etc., in systems that acquire 3D images present increasing challenges as required response times are reduced. Further challenges are also presented when the light that is reflected back from an object is not detected by the sensor of the 3D image acquisition system.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
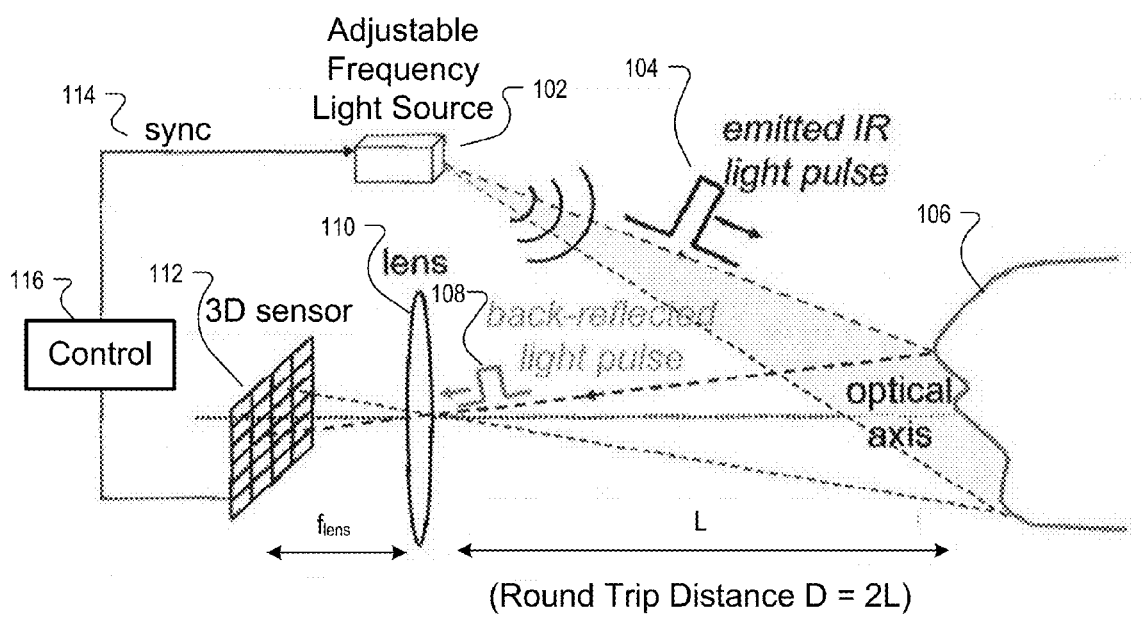
FIG. 1 is a block diagram that shows one example of a time of flight sensing system in accordance with the teachings of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

Methods and apparatuses for acquiring time of flight and depth information using a 3D time of flight sensor are disclosed. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Throughout this specification, several terms of art are used. These terms are to take on their ordinary meaning in the art from which they come, unless specifically defined herein or the context of their use would clearly suggest otherwise. For example, the term "or" is used in the inclusive sense (e.g., as in "and/or") unless the context clearly indicates otherwise.

As will be shown, examples of a time of flight sensing system including time of flight pixel cells are disclosed. In various examples, time of flight pixel cells in accordance with the teachings of the present invention are oversampled with multiple time of flight measurements between read outs, which reduces the unwanted effects of noise and jitter in the time of flight sensing system. For instance, in one example, hundreds, thousands, or more measurements may be accumulated and then scaled for each read out, which provides increased overall resolution and makes it possible to easily distinguish objects having only slight differences in depth. Furthermore, in various examples, multiple time of flight measurements may also be taken using light pulses that are emitted at varying frequencies that provide measurements having different ranges, which enable compensation for inaccuracies in time of flight measurements that result from reflected photons that are undetected by the photosensors of an example time of flight sensing system in accordance with the teachings of the present invention.

To illustrate, FIG. 1 is a block diagram that shows one example of a time of flight sensing system 100 in accordance with the teachings of the present invention. As shown, time of flight sensing system 100 includes a light source 102 that emits light pulses, which are illustrated as emitted light 104 in FIG. 1. In the illustrated example, light source 102 is an adjustable frequency light source such that the pulses of emitted light 104 may be emitted at different frequencies. As shown, emitted light 104 is directed to an object 106. In one example, emitted light 104 includes pulses of infrared (IR) light. It is appreciated that in other examples, emitted light 104 may have wavelengths other than infrared, such as for example visible light, near-infrared light, etc., in accordance with the teachings of the present invention. Emitted light 104 is then reflected back from object 106, which is shown as back reflected light 108 in FIG. 1. As shown, reflected light 108 is directed from object 106 through a lens 110 and is then focused onto a time of flight pixel array 112. In one example, time of flight pixel array 112 includes a plurality of time of flight pixel cells arranged in a two dimensional array. As will be discussed, in one example, a sync signal 114 is generated by control circuitry 116 coupled to time of flight pixel array 112, which synchronizes the pulses of emitted light 114 with corresponding signals that control the plurality of pixel cells in time of flight pixel array 112, which sense the reflected light 108, in accordance with the teachings of the present invention.

In the example depicted in FIG. 1, it is noted that time of flight pixel array 112 is positioned at a focal length $f_{lens}$ from lens 110. As shown in the example, the light source 102 and the lens 110 are positioned a distance L from the object. It is appreciated of course the FIG. 1 is not illustrated to scale and that in one example, the focal length $f_{lens}$ is substantially less than the distance L between lens 110 and object 106. Therefore, it is appreciated that for the purposes of this disclosure, the distance L and the distance L+focal length $f_{lens}$ are substantially equal for purposes of time of flight measurements in accordance with the teachings of the present invention. In addition, it is also appreciated that for the purposes of this disclosure, the distance between the light source 102 and the object 106, and the distance between the object 106 and the lens 110, and are also both substantially equal to L for purposes of time of flight measurements in accordance with the teachings of the present invention. Accordingly, the distance between the light source 102 and the object 106 (and/or the distance between the object 106 and the lens 110) is equal to half of the round trip distance, e.g., D, which is therefore equal to 2×L. In other words, it is assumed that the distance L from light source 102 to the object 106, plus the distance L back from the object 106 to the lens 110, is equal to the round trip distance D (or 2×L) in accordance with the teachings of the present invention.

In the depicted example, there is a delay time of TOF between the emission of a light pulse of emitted light 104 and the receipt of that light pulse in reflected light 108, which is caused by the amount of time that it takes for the light pulse to travel the distance L from light source 102 to object 106, and then the additional time it takes for the corresponding reflected light pulse 108 to travel the distance L back from object 106 to pixel array 112. The time difference TOF between emitted light 104 and reflected light 108 represents the time of flight for the light pulses to make the round trip between the light source 102 and object 106. Once the time of flight TOF is known, the distance L from light source 102 to object 106 can be determined using the following relationships in Equations 1 and 2 below:

$$TOF = \frac{2 \times L}{c} \quad (1)$$

$$L = \frac{T_{TOF} \times c}{2} \quad (2)$$

where c is the speed of light, which is approximately equal to $3 \times 10^8$ m/s, and TOF is the amount of time that it takes for the light pulse to travel to and from the object as shown in FIG. 1.

Figure 2:
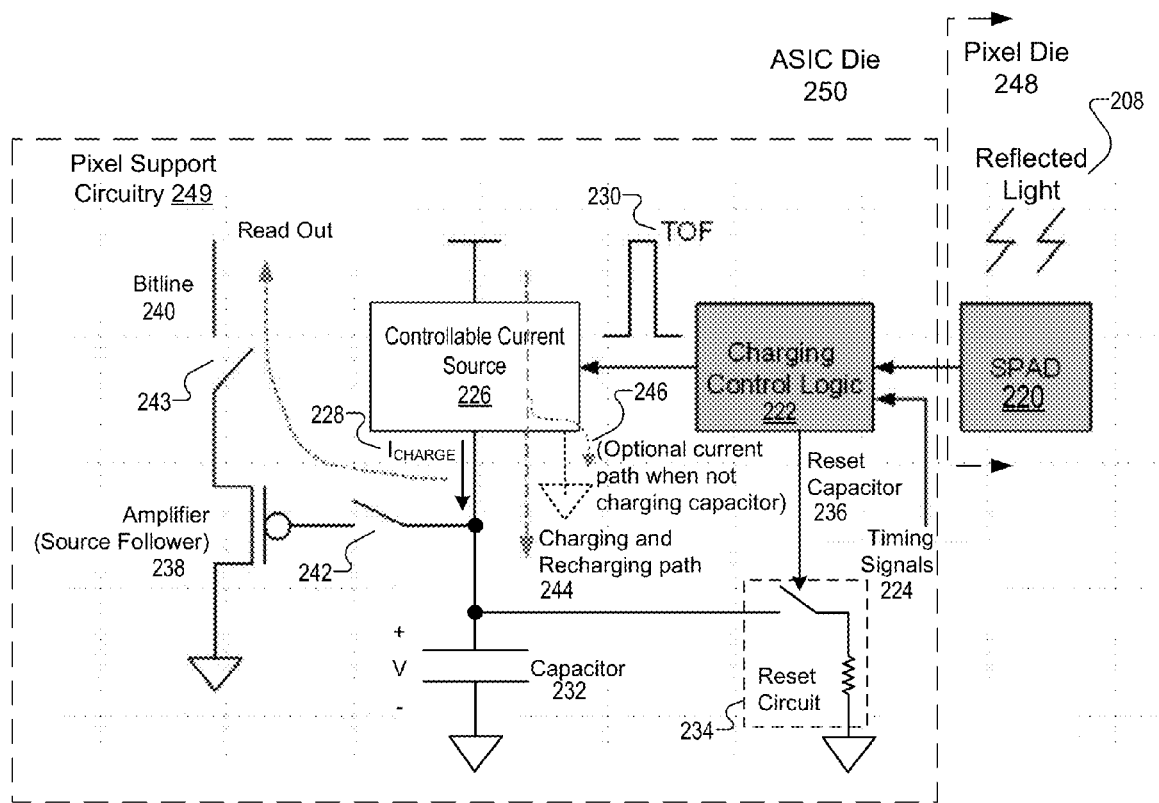
FIG. 2 is a schematic illustrating one example of a time of flight pixel in accordance with the teachings of the present invention.

FIG. 2 is a schematic illustrating one example of a time of flight pixel 218 in accordance with the teachings of the present invention. It is appreciated that pixel 218 may be one example of one of the plurality of pixels included for example in time of flight pixel array 112 of FIG. 1, and that similarly named and numbered elements referenced below are therefore coupled and function similar to as described above. As shown in the depicted example, pixel 218 includes a photosensor 220 and pixel support circuitry 249. Pixel support circuitry 249 includes charging control logic 222, controllable current source 226, capacitor 232, reset circuit 234, output switch 242, row select switch 243 and amplifier 238. Photosensor 220 senses photons of reflected light 208, which are reflected from an object, such as for example object 106 of FIG. 1. In one example, photosensor 220 may include a single photon avalanche diode (SPAD), as shown in FIG. 2.

In the example, pixel 218 also includes charging control logic 222 coupled to the photosensor 220 to detect when the photosensor 220 senses the photons of reflected light 208 that are reflected from the object. Charging control logic 222 is further coupled to receive timing signals 224, which in the example may be representative of when light pulses 104 are emitted from the light source 102 to the object 106, and therefore enable pixel 218 to be synchronized with light source 102 in accordance with the teachings of the present invention.

As shown in the depicted example, a controllable current source 226 is coupled to provide a charge current $I_{CHARGE}$ 228 in response to a time of flight signal 230 coupled to be received from the charging control logic 222. In the example, the time of flight signal 230 is generated by charging control logic 222, and is representative of the time of flight for the round trip travel of each one of the light pulses 104 emitted from the light source 102 until the photosensor 220 senses a respective one of the photons of the reflected light 208 reflected from the object 106 in accordance with the teachings of the present invention.

In the example, an energy storage device illustrated for example as a capacitor 232 is coupled to receive the charge current $I_{CHARGE}$ 228 from the controllable current source 226 in response to the time of flight signal 230. In one example, the controllable current source 226 is coupled to provide the charge current $I_{CHARGE}$ 228 to the capacitor 232 after each light pulse 104 is emitted from the light source 102 until the photosensor 220 senses a respective one of the photons of reflected light 208 reflected from the object 106 in accordance with the teachings of the present invention. As a result, a voltage V accumulated on the capacitor 232 is representative of a round trip distance D to the object 106 in accordance with the teachings of the present invention. In one example, a reset circuit 234 is coupled to capacitor 232 to reset the accumulated voltage V on the capacitor 232 in response to a reset capacitor signal 236 after capacitor 232 is charged a plurality of n times by the controllable current source 226 in response to the time of flight signal 230 in accordance with the teachings of the present invention.

As shown in the example, pixel 218 also includes an amplifier 238 that is coupled to the capacitor 232 through an output switch 242 to read out the voltage V accumulated on the capacitor 232 after being charged the plurality of n times by the controllable current source 226 in response to the time of flight signal 230. In the example, the reset circuit 234 is coupled to reset the voltage V accumulated on the capacitor 232 after the voltage V on the capacitor 232 has been read out in accordance with the teachings of the present invention. In one example, the amplifier 238 is a source follower coupled transistor as shown, and the output switch 242 is coupled between the capacitor 232 and the gate of the transistor of amplifier 238. In one example, pixel 218 also includes a row select switch 243 coupled between an output of the amplifier 238 and a bitline 240, through which the output of pixel 218 may be read out in accordance with the teachings of the present invention.

As shown in the example depicted in FIG. 2, controllable current source 226 includes a charging and recharging path 244 through which charge current $I_{CHARGE}$ 228 is conducted to charge capacitor 232. In one example, charge current $I_{CHARGE}$ 228 through charging and recharging path 244 is switched current path such that no charge current $I_{CHARGE}$ 228 flows when capacitor 232 is not charged. In another example, controllable current source 226 includes an alternate optional current path 246 through which charge current $I_{CHARGE}$ 228 is conducted when capacitor 232 is not charged. For instance, in one example charge current $I_{CHARGE}$ 228 is diverted from charging and recharging path 244 to optional current path 246 when a photon is detected by photosensor 220 until a next light pulse 104 is emitted from light source 102 in accordance with the teachings of the present invention. It is appreciated that in an example in which optional current path 246 is included, charge current $I_{CHARGE}$ 228 consumption is constant in pixel 218 whether or not capacitor 232 is being charged in accordance with the teachings of the present invention.

As illustrated in the example depicted in FIG. 2, it is noted that pixel 218 may be implemented in a stacked chip scheme. For instance, as shown in the example, photosensor 220 may be included in a pixel die 248, while pixel support circuitry 249 of pixel 218 illustrated in FIG. 2 may be included in a separate application specific integrated circuit (ASIC) die 250 in accordance with the teachings of the present invention. In the example, the pixel die 248 and ASIC die 250 are stacked and coupled together during fabrication to implement a time of flight sensing system in accordance with the teachings of the present invention.

Figure 3:
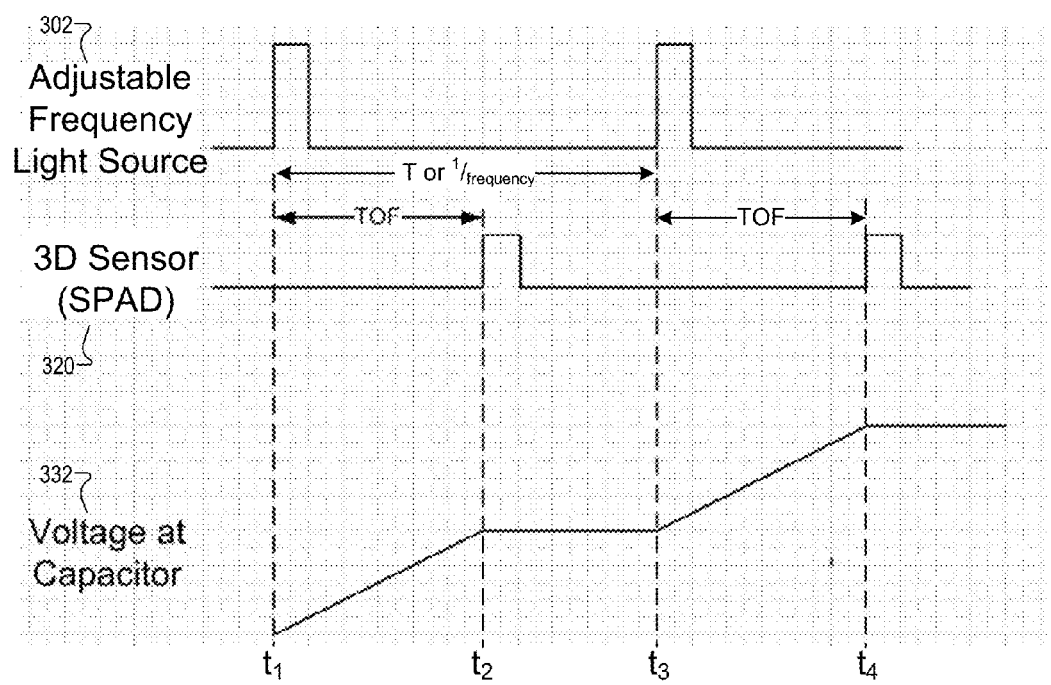
FIG. 3 is a timing diagram that shows an example of emitted light pulses, the respective reflected photons that are sensed by a photosensor, and the corresponding voltage accumulated on a capacitor in an example time of flight pixel in accordance with the teachings of the present invention.

FIG. 3 is a timing diagram that shows an example of emitted light pulses from an adjustable frequency light source 302, the respective reflected photons that are sensed by a 3D sensor 320, and the corresponding voltage accumulated on a capacitor 332 in an example time of flight pixel in accordance with the teachings of the present invention. It is appreciated that adjustable frequency light source 302 may correspond for example with adjustable frequency light source 102 of FIG. 1, that 3D sensor 320 may correspond for example with photosensor 220 of FIG. 2, that the corresponding voltage accumulated on a capacitor 332 may correspond for example with the voltage V accumulated in capacitor 232 of FIG. 2, and that similarly named and numbered elements referenced below are therefore coupled and function similar to as described above. As shown in the example, light pulses are emitted at time t1 and at time t3. In the example, the period between the emissions of light pulses at time t1 and time t3 is equal to T, which is also equal to 1/frequency that the light pulses are emitted from the light source 102. It is therefore appreciated of course that if the frequency of the emissions of the light pulses is increased, the period of time T between time t1 and time t3 is reduced.

The example depicted in FIG. 3 also illustrates that the 3D sensor 320 detects the photons that are reflected back from the object 106 at time t2 and time t4. Accordingly, the time of flight TOF for the emitted light pulses 104 to travel the round trip distance D back and forth between light source 102 and photosensor 220 is equal to the time between time t1 and t2, and/or the time between t3 and t4 as illustrated in FIG. 3 in accordance with the teachings of the present invention.

The example in FIG. 3 also illustrates that the capacitor 232 is charged when a light pulse 104 is emitted from light source 102 until a reflected photon in back reflected light 208 is detected by sensor 220 in accordance with the teachings of the present invention. After the reflected photon is detected by sensor 220, the capacitor 232 is not charged until the next light pulse 104 is emitted from light source 102 in accordance with the teachings of the present invention. Accordingly, the voltage on capacitor 332 accumulates during the time of flight TOF of the light pulses between time t1 and time t2, and between time t3 and time t4, and there is no accumulation of additional voltage on capacitor 332 between time t2 and time t3, and after time t4 in FIG. 3 as shown in accordance with the teachings of the present invention.

Figure 4A:
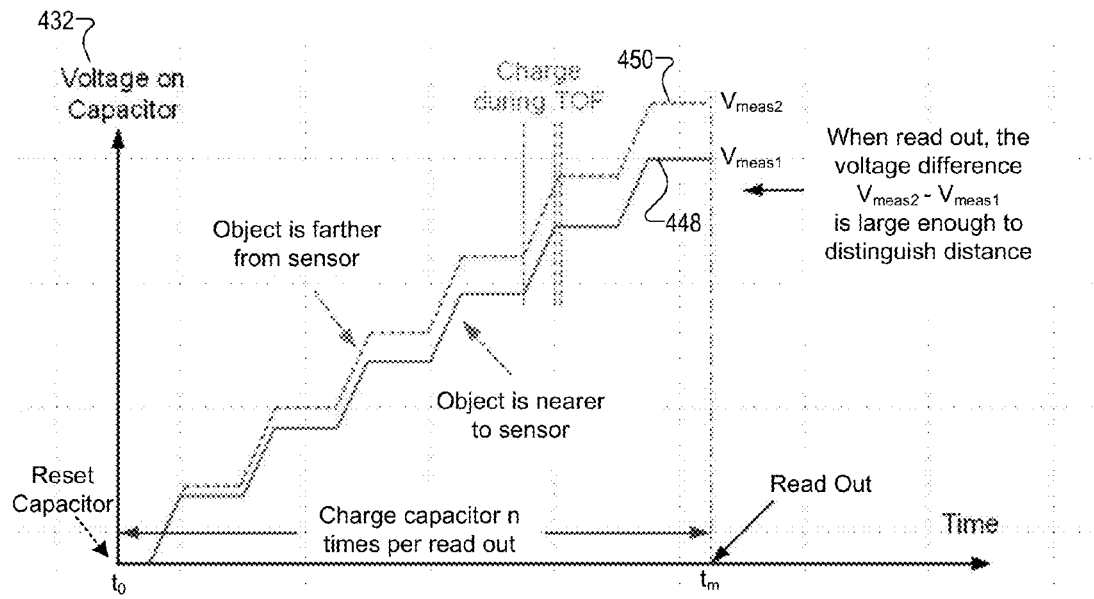
FIG. 4A is a timing diagram that shows an example of the voltage being accumulated on a capacitor during the time of flight of each round trip of a plurality of pulses of light that are emitted from a light source to and from objects in accordance with the teachings of the present invention.

FIG. 4A is a timing diagram that shows an example of the voltage being accumulated, or oversampled, on a capacitor 432 during the time of flight of each round trip of pulses of light that are emitted from a light source to and from objects in accordance with the teachings of the present invention. In one example, the capacitor is initially reset at time to $t_0$ a known voltage, such as for example zero volts. In the example, a plurality of n pulses of light 104 are emitted from light source 102 such that charge on capacitor 232 is accumulated n times for the duration of the time of flight of each one of the light pulses from light source 102 to object 106 and back to sensor 220. After the capacitor 232 has been charged or oversampled the n times, the capacitor is then read out at time $t_m$ in accordance with the teachings of the present invention.

In the example shown in FIG. 4A, the graphs for two different time of flight measurements are shown for comparison. In particular, graph 448 shows an example of the voltage on capacitor 432 for n charges for an object that is closer to the photosensor 220, and graph 450 shows an example of the voltage on capacitor 432 for n charges for an object that is farther from the photosensor 220. As shown in the example, since the voltage is on capacitor 432 is accumulated for n charges, the voltages on capacitor 432 are large enough to read out by the time of flight sensing system with a sufficient signal-to-noise ratio. For instance, in the depicted example, the measured voltage $V_{meas1}$ is read out for graph 448 after n charges, and the measured voltage $V_{meas2}$ is read for graph 450 after the n charges. In addition, the example depicted in FIG. 4A shows that when read out, the difference between the voltage measurements $V_{meas1}$ and $V_{meas2}$ for graph 448 and graph 450 are large enough to distinguish the round trip distance differences between the objects of graph 448 and graph 450 in accordance with the teachings of the present invention.

In one example, after the time of flight measurements are read out after the n charges on the capacitor as shown, the measurements may then be scaled to account for the oversampling. For instance, in one example, assuming that a voltage measurement of $V_{meas}$ from the capacitor is read out after the n charges, the measurement $V_{meas}$ may then be scaled by the number of charges, n, to generate an average value for $V_{avg}$ for each time of flight measurement:

$$V_{avg} = \frac{V_{meas}}{n} \quad (3)$$

where $V_{avg}$ is the average measurement, $V_{meas}$ is the measurement read out from the capacitor after the n charges, and n is the number of times the capacitor was charged for that read out.

Figure 4B:
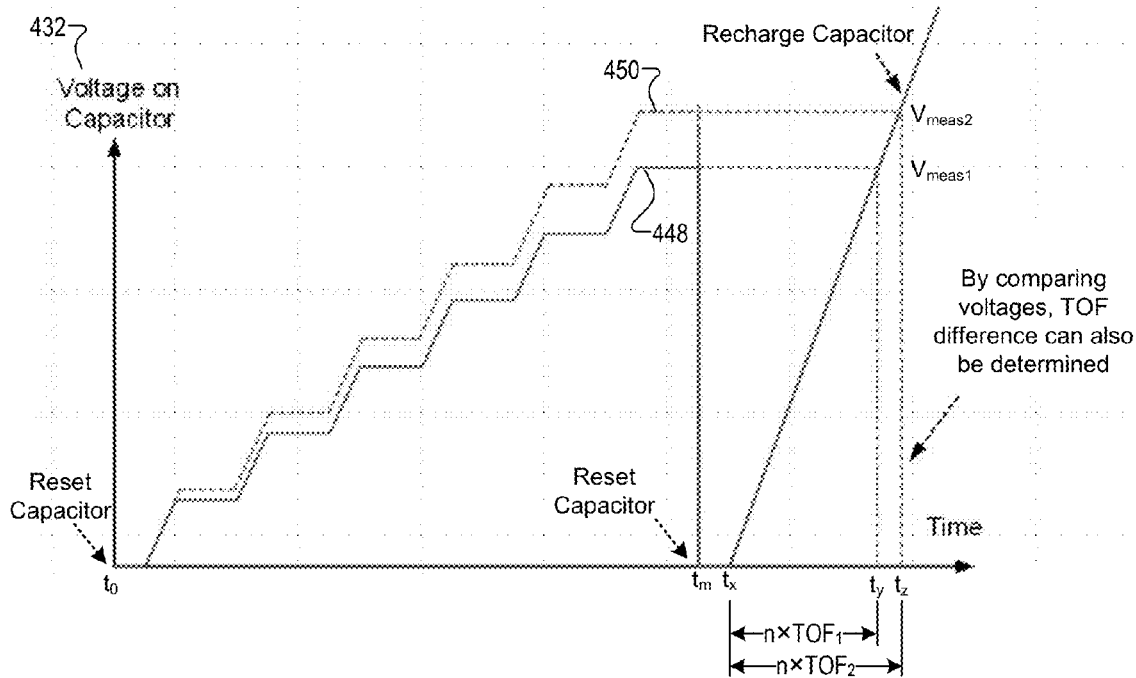
FIG. 4B is a timing diagram that shows an example a capacitor being reset and then recharged to a measured voltage after that voltage had been accumulated on a capacitor to determine time of flight information in accordance with the teachings of the present invention.

FIG. 4B is another timing diagram that shows the example of the voltages being accumulated shown in FIG. 4A, with voltage on capacitor 432 then being reset and then recharged to determine the time of flight measurements for graphs 448 and 450 in accordance with the teachings of the present invention. In particular, the capacitor is initially reset at time $t_0$ to a known voltage, such as for example zero volts. In the example, the voltage on capacitor 432 is accumulated n times for the n time of flight measurements for graphs 448 and 450. After the capacitor has been charged the n times, the capacitor is then read out at time $t_m$, as discussed above.

The example depicted in FIG. 4B also shows that after the capacitor is then reset at time $t_m$, the capacitor is then recharged back to the measured voltages $V_{meas1}$ and $V_{meas2}$, which may performed to help determine time of flight information in accordance with the teachings of the present invention. For instance, as shown in the depicted example, the capacitor is recharged starting at time $t_x$ to $t_y$ to reach $V_{meas1}$, and may be charged further to reach $V_{meas2}$ at time $t_z$ as shown. Assuming that the capacitor was charged n times, the average time of flight for each charge in graph 448 can be determined according to the following relationship $$t_y - t_x = n \times TOF_1 \quad (4)$$

where $TOF_1$ is the average time of flight associated with each charge in graph 448 and n is the number of charges per read out. Similarly, the average time of flight for each charge in graph 450 can be determined according to the following relationship $$t_z - t_x = n \times TOF_2 \quad (5)$$

where $TOF_2$ is the average time of flight associated with each charge in graph 450 and n is the number of charges per read out. It is appreciated that by comparing the measurements, the difference $t_z - t_y$ in the time of flights in graphs 448 and 450 can also be determined in accordance with the teachings of the present invention.

Figure 5A:
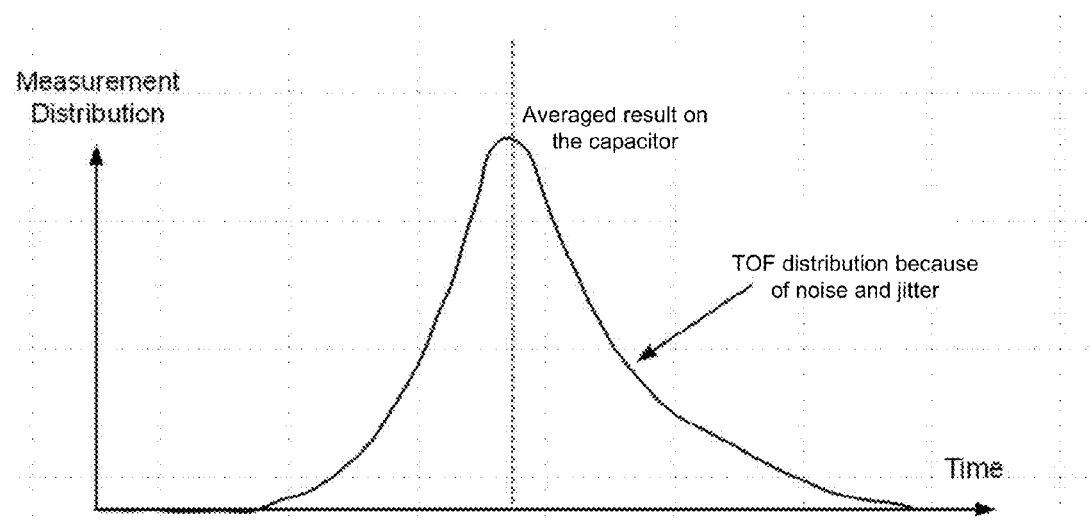
FIG. 5A is diagram that shows a distribution of time of flight measurements of emitted light pulses to and from an object using an example time of flight sensing system in accordance with the teachings of the present invention.

FIG. 5A is diagram that shows a distribution of time of flight measurements of emitted light pulses to and from an object using an example time of flight sensing system in accordance with the teachings of the present invention. In particular, since there is random noise and jitter in a time of flight sensing system, multiple time of flight measurement results will have a distribution as shown in FIG. 5A. With multiple time of flight measurements, the capacitor averages all of the measured results, and the peak in the distribution is therefore determined to be the averaged result, which accounts for the noise, jitter, or clock in the time of flight sensing system in accordance with the teachings of the present invention.

Referring briefly back to FIG. 2, it is noted that in an ideal situation, all of the photons that are reflected back in reflected light 208 from an object 106 would be detected by the photosensor 220. Accordingly, the charging control 222 would therefore control the controllable current source 226 not to charge the capacitor 232 with charge current $I_{CHARGE}$ 228 once each reflected back photon in reflected light 208 is detected. However, more realistically, only some of the reflected back photons in reflected light 208 may be detected by photosensor 220. As a consequence, the remaining reflected back photons in reflected light 208 go undetected, which therefore causes in the charge current $I_{CHARGE}$ 228 to erroneously continue charging the capacitor 232 until a maximum time is ultimately reached for that cycle. The maximum time is based on the period or frequency of the emitted light pulses 104.

To illustrate, referring briefly back to FIG. 3, a photon that is reflected back should be detected by the photosensor 220, as shown with 3D sensor 320, which would turn off the charging of the capacitor, which is shown for example at time $t_2$ or at time $t_4$. However, if a photon that is reflected back in reflected light 208 is not detected by the photosensor 220, then the charge current $I_{CHARGE}$ 228 continues to charge the capacitor 232 until nearly the next cycle of the adjustable frequency light source 302, at which time a next light pulse 104 is emitted from light source 102. In other words, if a photon that is reflected back in reflected light 208 is not detected by the photosensor 220, the capacitor 232 is mistakenly charged for the maximum time for that cycle of the adjustable frequency light source 302. That maximum charge time translates to the maximum range for that particular frequency or period T of the adjustable frequency light source 302.

Figure 5B:
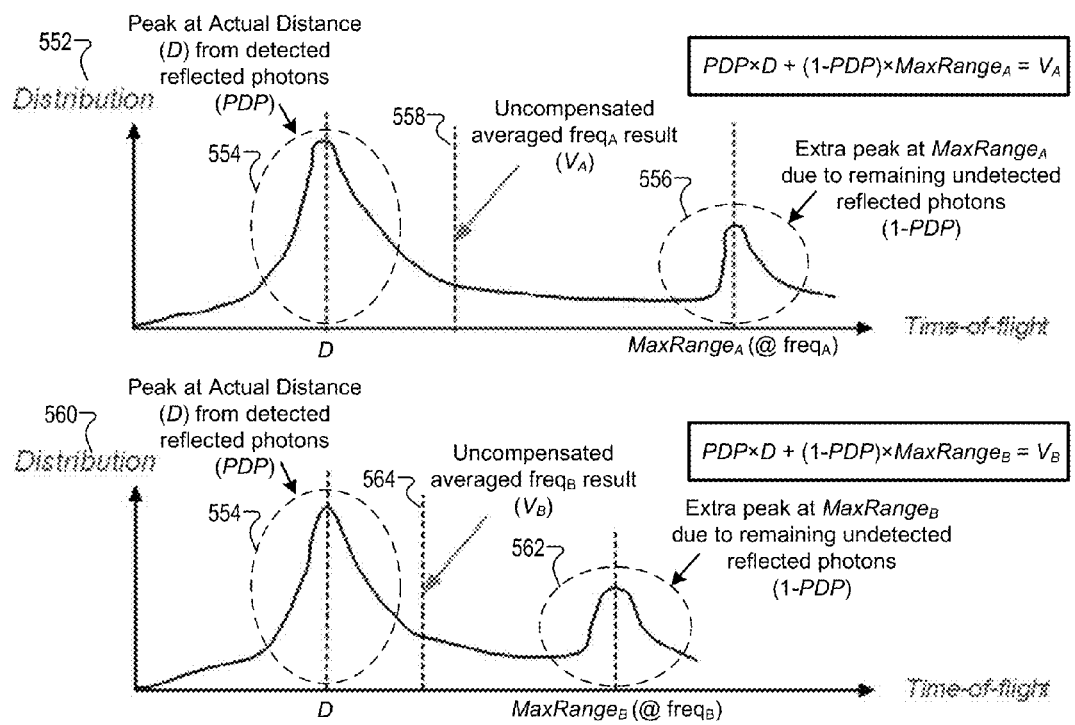
FIG. 5B illustrates diagrams that show distributions of time of flight measurements of light pulses that are emitted at first and second frequencies in an example time of flight sensing system to compensate for the undetected reflected back photons in accordance with the teachings of the present invention.

FIG. 5B illustrates diagrams that show distributions of time of flight measurements of light pulses that are emitted at first and second frequencies in an example time of flight sensing system to compensate for the undetected reflected back photons in accordance with the teachings of the present invention. In particular, top distribution graph 552 of FIG. 5B illustrates an example measurement distribution of a time of flight measurement taken with the adjustable frequency light source 102 set to a frequency equal to $freq_a$. As shown in the example, there are two peaks in distribution graph 552. The example peak 554 on the left hand side of the distribution graph 552 corresponds to the actual round trip distance D to the object 106 as indicated by the fraction of the reflected back photons that were actually detected by the photosensor 220. However, the example peak 556 on the right hand side of the distribution graph 552 corresponds to the maximum range MaxRange$_A$ at a frequency of freq$_a$, resulting from the remaining fraction of the reflected back photons that were undetected by the photosensor 220. In the example, the extra unwanted peak 556 at MaxRange$_A$ distorts the time of flight measurement distribution graph 552, causing the overall uncompensated averaged result for distribution graph 552 to be at V$_A$ 558, which as shown in FIG. 5B is shifted over to the right in distribution graph 552 from the actual round trip distance D.

Assuming that percentage of reflected back photons that are detected by photosensor 220 can expressed with a photon detection probability (PDP), the peak 554 at the actual round trip distance D may be represented with the term:

$$PDP \times D. \quad (6)$$

Correspondingly, the remaining percentage of reflected back photons that are undetected by photosensor 220 is equal to (1−PDP), and the peak 556 at the MaxRange$_A$ for frequency freq$_a$ may therefore be represented with the term:

$$(1-PDP) \times \text{MaxRange}_A. \quad (7)$$

Finally, as discussed above, the overall uncompensated averaged result for distribution graph 552 is measured to be V$_A$ 558, which is determined with only the fraction PDP of the photons being detected and the frequency of the adjustable light source being equal to freq$_a$. Thus, the top distribution graph 552 of FIG. 5B can be represented according to Equation 8 below:

$$PDP \times D + (1-PDP) \times \text{MaxRange}_A = V_A. \quad (8)$$

In order to determine the actual round trip distance D without knowing the actual percentage of photons that were actually detected by the photosensor 220, it can be assumed that the maximum range can be determined based on the frequency of the light source, and that the overall uncompensated averaged result V$_A$ 558 can be measured.

With these assumptions in mind, FIG. 5B shows another example measurement distribution of a time of flight measurement distribution graph 560 taken with the adjustable frequency light source 102 set to a different frequency equal to freq$_b$ in accordance with the teachings of the present invention. As shown in the example, there are also two peaks in distribution graph 560, including the same example peak 554 on the left hand side of the distribution graph 560, which corresponds to the actual round trip distance D to the object 106 as indicated by the fraction of the reflected back photons that were actually detected by the photosensor 220.

However, the example peak 562 on the right hand side of the distribution graph 560 corresponds to the maximum range MaxRange$_B$ at the frequency of freq$_b$, resulting from the remaining fraction of the reflected back photons that were undetected by the photosensor 220. In the example, the extra unwanted peak 562 at MaxRange$_B$ also distorts the time of flight measurement distribution causing the overall uncompensated averaged result for distribution graph 560 to be at V$_B$ 564, which as shown in FIG. 5B is shifted over to the right in distribution graph 560 from the actual round trip distance D.

In the depicted example, it is assumed that frequency freq$_b$ that is illustrated in the bottom distribution graph 560 of FIG. 5B is greater than the frequency freq$_a$ illustrated in the top distribution graph 552 of FIG. 5B. Accordingly, the period of time T for each cycle of the light pulses in bottom distribution graph 560 of FIG. 5B is shorter than the period of time T for each cycle of the light pulses in to distribution graph 552 of FIG. 5B, which results in MaxRange$_B$ being less than the MaxRange$_A$, as shown in FIG. 5B. It is also appreciated that the bottom distribution graph 560 of FIG. 5B can be represented according to Equation 9 below:

$$PDP \times D + (1-PDP) \times \text{MaxRange}_B = V_B. \quad (9)$$

With Equation 8 and Equation 9 above, it is appreciated that there are two equations with only two unknown variables, D and PDP. The other terms V$_A$, V$_B$, MaxRange$_A$, and MaxRange$_B$ are all known because V$_A$ and V$_B$ are measured, and MaxRange$_A$ and MaxRange$_B$ can be determined from the respective frequencies freq$_a$ and freq$_b$. In addition, although PDP is an unknown variable, it can be assumed that PDP at least does not change between the measurements of V$_A$ and V$_B$ using the two different frequencies, e.g., freq$_a$ and freq$_b$, in accordance with the teachings of the present invention.

Continuing with Equation 9 above, PDP can be isolated on the left hand side of the equation as follows:

$$PDP \times D + \text{MaxRange}_B - PDP \times \text{MaxRange}_B = V_B, \quad (10)$$

$$PDP \times D - PDP \times \text{MaxRange}_B = V_B - \text{MaxRange}_B, \quad (11)$$

$$PDP \times (D - \text{MaxRange}_B) = V_B - \text{MaxRange}_B, \quad (12)$$

$$PDP = \frac{(V_B - \text{MaxRange}_B)}{(D - \text{MaxRange}_B)}. \quad (13)$$

Next, PDP can be substituted with Equation 13 back into Equation 8 above:

$$\frac{(V_B - \text{MaxRange}_B)}{(D - \text{MaxRange}_B)} \times D + \left(1 - \frac{(V_B - \text{MaxRange}_B)}{(D - \text{MaxRange}_B)}\right) \times \text{MaxRange}_A = V_A. \quad (14)$$

Finally, D can be solved for in Equation 14 above to determine the actual round trip distance D in accordance with the teachings of the present invention. Therefore, the distortions in the measurement distributions caused by the percentage (1−PDP) of reflected photons that are not detected can be compensated for in accordance with the teachings of the present invention.

Figure 6:
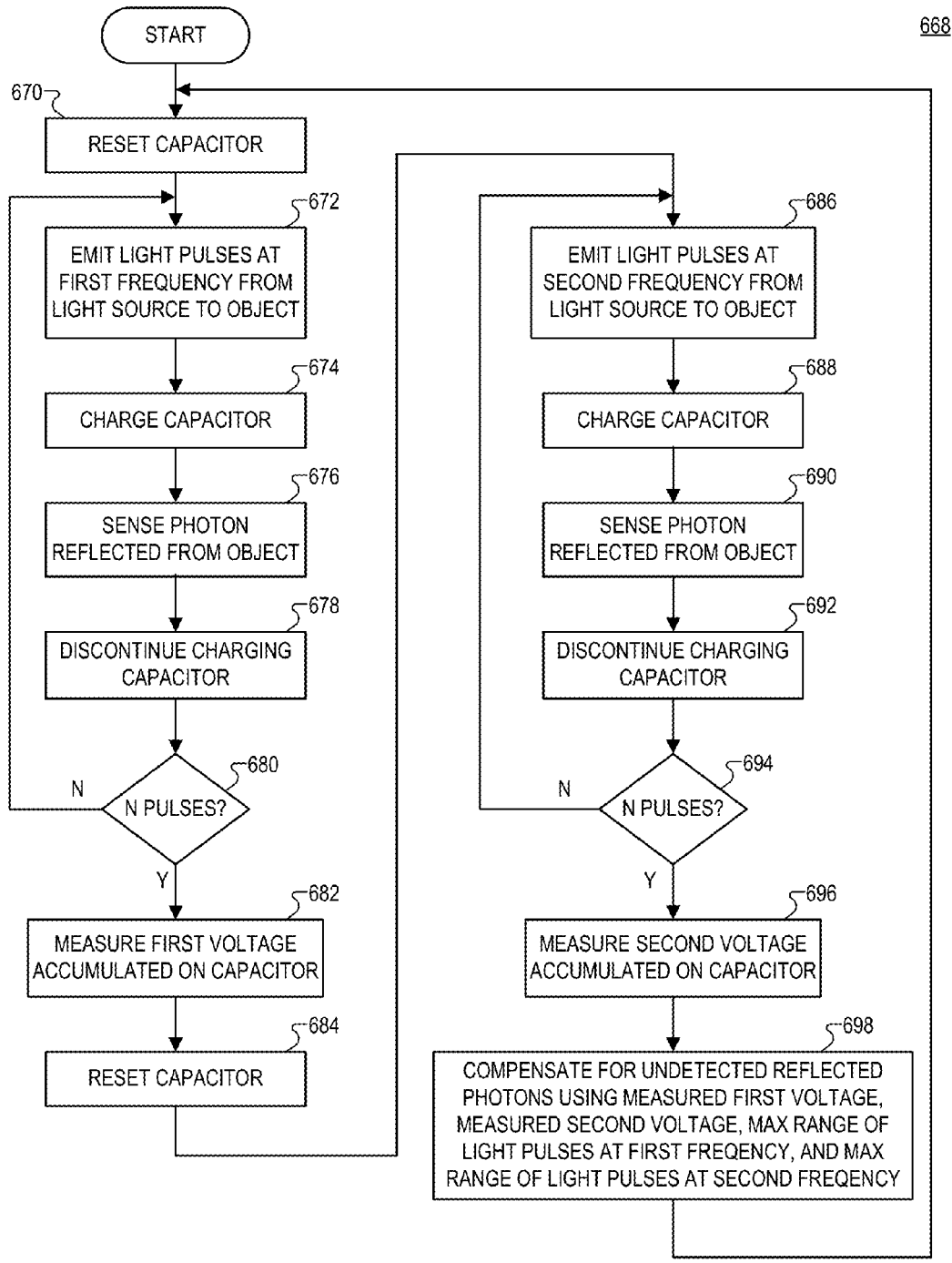
FIG. 6 illustrates an example flow diagram that shows processing steps to determine time of flight information of emitted light pulses to and from an object, and compensate for undetected reflected photons in accordance with the teachings of the present invention.

FIG. 6 illustrates an example flow diagram 668 that shows processing steps to determine time of flight information of emitted light pulses to and from an object, and compensate for undetected reflected photons in accordance with the teachings of the present invention. As shown at process block 670, the capacitor in the pixel cell circuit is reset. In one example, the capacitor is initialized to a known voltage, such as for example zero volts. Process block 672 shows that light pulses are then emitted at a first frequency (e.g., freq$_a$) from a light source to an object. At this time, process block 674 shows that charging then begins (or is resumed) on the capacitor. At process block 676, a photon that is reflected back from the object is then sensed. At this time, process block 678 shows that the charging of the capacitor is discontinued. This process continues for a plurality of n light pulses from the light source. As such, decision block 680 determines whether there has yet been n light pulses emitted at the first frequency. If not, processing loops back to process block 672. If so, processing continues to process block 682 where a first voltage (e.g., $V_A$) accumulated on the capacitor is measured. Once the first voltage is measured, process block 684 shows that the voltage on the capacitor is then reset to initialize it for the next measurement.

Processing continues to process block 686, which shows that light pulses are then emitted at a second frequency (e.g., $freq_b$) from the light source to an object. The second frequency is different than the first frequency. At this time, process block 688 shows that charging then resumed on the capacitor. At process block 690, a photon that is reflected back from the object is then sensed. At this time, process block 692 shows that the charging of the capacitor is discontinued. This process continues for a plurality of n light pulses from the light source. As such, decision block 694 determines whether there has yet been n light pulses emitted at the second frequency. If not, processing loops back to process block 686. If so, processing continues to process block 696 where a second voltage (e.g., $V_B$) accumulated on the capacitor is measured. Once the second voltage is measured, process block 698 shows that the undetected reflected photons are compensated for by using the first voltage (e.g., $V_A$), the second voltage (e.g., $V_B$), the maximum range (e.g., $MaxRange_A$) of the light pulses at the first frequency (e.g., $freq_a$), and the maximum range (e.g., $MaxRange_B$) of the light pulses at the second frequency (e.g., $freq_b$). In one example, Equations 8 and 9 as discussed above can be used to compensate for the undetected reflected back photons in accordance with the teachings of the present invention.

Figure 7:
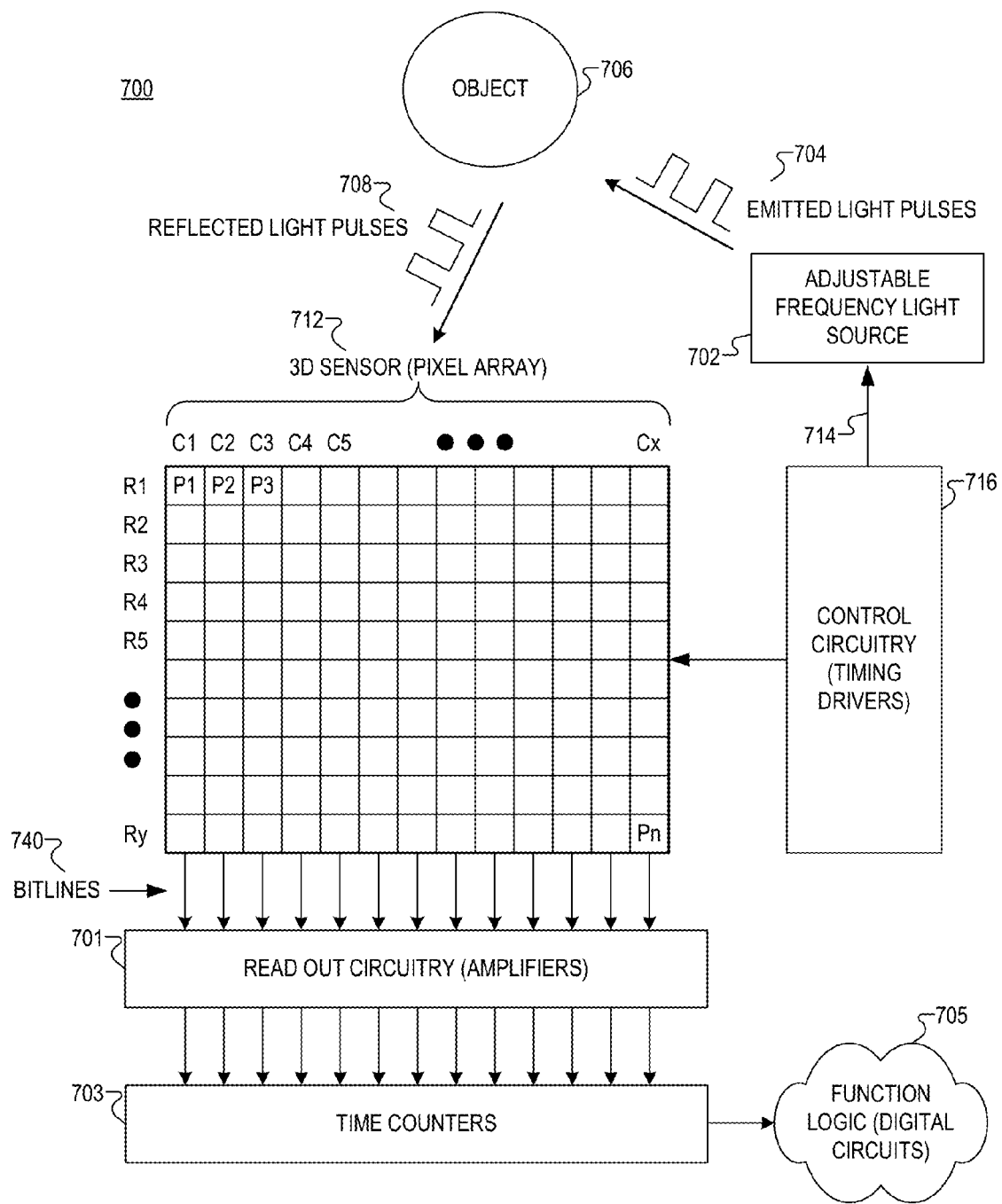
FIG. 7 is block diagram that shows a portion of an example time of flight sensing system including a time of flight pixel array with corresponding readout circuitry, control circuitry and function logic in accordance with the teachings of the present invention.

FIG. 7 is block diagram that shows a portion of an example time of flight sensing system 700 including a time of flight pixel array with corresponding readout circuitry, control circuitry and function logic in accordance with the teachings of the present invention. As shown, the illustrated example of time of flight sensing system 700 includes a time of flight pixel array 712, readout circuitry 701, time counters 703, function logic 705, control circuitry 716, and an adjustable frequency light source 702 to sense the round trip distance to object 706 in accordance with the teachings of the present invention.

In the example illustrated in FIG. 7, pixel array 712 is a two dimensional (2D) array of time of flight pixels (e.g., pixels P1, P2 . . . , Pn). In one example, each of the time of flight pixels P1, P2, . . . , Pn may be substantially similar to one of the time of flight pixels discussed above in FIG. 2, and that similarly named and numbered elements referenced below are therefore coupled and function similar to as described above. As illustrated, each pixel is arranged into a row (e.g., rows R1 to Ry) and a column (e.g., column C1 to Cx) to acquire time of flight information of an image object 706 focused onto pixel array 712. Thus, the time of flight information can then be used to determine the distance or depth information to the object 706 in accordance with the teachings of the present invention.

In one example, control circuitry 716 is controls and synchronizes adjustable frequency light source 702 with a sync signal 714 to emit light pulses 714 to object 706. The reflected back light pulses 708 are then reflected back to pixel array 712 as shown. In one example, the pixels in pixel array 712 senses the photons from the reflected back light pulses 708, and the corresponding signals responsive to the measured voltages from the respective capacitors included in the pixels in pixel array 712 are then read out by read out circuitry 701 through bitlines 740 as shown. In one example, read out circuitry 701 may include amplifiers to further amplify the signals received through bitlines 740. In one example, the information read out by read out circuitry 701 may then be transferred to time counters 703, which in one example can be used to keep track of time information regarding the time of flight information received from read out circuitry 701. In one example, the time counters 701 may then output information to digital circuits included in the function logic 705 in accordance with the teachings of the present invention. In one example, function logic 705 may determine the time of flight and distance information for each pixel. In one example, function logic may also store the time of flight information and/or even manipulate the time of flight information (e.g., crop, rotate, adjust for background noise, or the like). In one example, readout circuitry 701 may read out an entire row of time of flight information at a time along the bitlines 740 (illustrated), or in another example may readout the time of flight information using a variety of other techniques (not illustrated), such as a serial readout or a full parallel readout of all pixels simultaneously.

In the illustrated example, control circuitry 716 is further coupled to pixel array 712 to control the operation of pixel array 712, as well as synchronize the operation of pixel array 712 with adjustable frequency light source 702. For example, control circuitry 716 may generate the timing signals 224 coupled to be received by the charging control logic 222, as well as the output switch 242 and row select switch 243 shown in FIG. 2 to determine the time of flight information in accordance with the teachings of the present invention.

In one example, it is noted that time of flight sensing system 700 illustrated in FIG. 7 may be implemented in a stacked chip scheme. For instance, as shown in the example, pixel array 712 may be included in a pixel die, while readout circuitry 701, time counters 703, function logic 705, and control circuitry 716, as illustrated in FIG. 7, may be included in a separate application specific integrated circuit (ASIC) die in accordance with the teachings of the present invention. In the example, the pixel die and ASIC die are stacked and coupled together during fabrication to implement a time of flight sensing system in accordance with the teachings of the present invention.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A time of flight pixel cell, comprising:
   a photosensor to sense photons reflected from an object; and
   pixel support circuitry including:
      charging control logic coupled to the photosensor to detect when the photosensor senses the photons reflected from the object, wherein the charging control logic is further coupled to receive timing signals representative of when light pulses are emitted from a light source to the object;

a controllable current source coupled to provide a charge current in response to a time of flight signal coupled to be received from the charging control logic, wherein the time of flight signal is representative of a time of flight of each one of the light pulses emitted from the light source until the photosensor senses a respective one of the photons reflected from the object;

a capacitor coupled to receive the charge current from the controllable current source in response to the time of flight signal, wherein a voltage on the capacitor is representative of a round trip distance to the object; and a reset circuit coupled to reset the voltage on the capacitor after being charged a plurality number of times by the controllable current source in response to the time of flight signal.

2. The time of flight pixel cell of claim 1 wherein the pixel support circuitry further comprises an amplifier coupled to the capacitor to read out the voltage on the capacitor after being charged the plurality number of times by the controllable current source in response to the time of flight signal, wherein the reset circuit coupled to reset the voltage on the capacitor after the voltage on the capacitor is read out.

3. The time of flight pixel cell of claim 2 wherein the capacitor is further coupled to be recharged to the voltage that is read out on the capacitor after being reset to determine time of flight information.

4. The time of flight pixel cell of claim 2 wherein the pixel support circuitry further comprises an output switch coupled between the capacitor and the gate of the amplifier.

5. The time of flight pixel cell of claim 2 wherein the pixel support circuitry further comprises a row select switch coupled between an output of the amplifier and a bitline.

6. The time of flight pixel cell of claim 1 wherein the controllable current source is coupled to provide the charge current to the capacitor after each light pulse is emitted from the light source until the photosensor senses the respective one of the photons reflected from the object.

7. The time of flight pixel cell of claim 6 wherein the controllable current source includes an alternate current path to conduct the charge current after the photosensor senses the respective one of the photons reflected from the object until a next light pulse is emitted from the light source.

8. The time of flight pixel cell of claim 1 wherein the voltage on the capacitor scaled by the plurality number of times that the voltage on the capacitor is charged by the controllable current source is representative of the round trip distance to the object.

9. The time of flight pixel cell of claim 1 wherein a first voltage is coupled to be read out from the capacitor that is coupled to be charged by the controllable current source in response to light pulses that are emitted at a first frequency from the light source, wherein a second voltage is coupled to be read out from the capacitor that is coupled to be charged by the controllable current source in response to light pulses that are emitted at a second frequency from the light source, and wherein a compensated round trip distance to the object is determined in response to the first voltage, the second voltage, a first maximum range of the light pulses that are emitted at the first frequency from the light source, and a second maximum range of the light pulses that are emitted at the second frequency from the light source.

10. The time of flight pixel cell of claim 9 wherein the compensated round trip distance to the object compensates for photons reflected from the object that are undetected.

11. The time of flight pixel cell of claim 1 wherein the photosensor comprises a single photon avalanche diode (SPAD).

12. The time of flight pixel cell of claim 1 wherein the photosensor is included in a first die and wherein the pixel support circuitry is included in a second die, wherein the first die and second die are stacked and coupled together.

13. A time of flight sensing system, comprising:

a light source to emit light pulses to an object, wherein a frequency at which the light pulses are emitted from the light source is adjustable;

a time of flight pixel array having a plurality of time of flight pixel cells, wherein each one of the time of flight pixel cells comprises:

a photosensor to sense photons reflected from the object;

charging control logic coupled to the photosensor to detect when the photosensor senses the photons reflected from the object, wherein the charging control logic is further coupled to receive timing signals representative of when the light pulses are emitted from the light source;

a controllable current source coupled to provide a charge current in response to a time of flight signal coupled to be received from the charging control logic, wherein the time of flight signal is representative of a time of flight of each one of the light pulses emitted from the light source until the photosensor senses a respective one of the photons reflected from the object;

a capacitor coupled to receive the charge current from the controllable current source in response to the time of flight signal, wherein a voltage on the capacitor is representative of a round trip distance to the object;

a reset circuit coupled to reset the voltage on the capacitor after being charged a plurality number of times by the controllable current source in response to the time of flight signal; and control circuitry coupled to the light source and to the time of flight pixel array to synchronize a timing of the emission of the light pulses with the sensing of the photons reflected from the object.

14. The time of flight sensing system of claim 13 wherein each one of the time of flight pixel cells further comprises an amplifier coupled to the capacitor to read out the voltage on the capacitor after being charged the plurality number of times by the controllable current source in response to the time of flight signal, wherein the reset circuit coupled to reset the voltage on the capacitor after the voltage on the capacitor is read out.

15. The time of flight sensing system of claim 14 wherein the capacitor is further coupled to be recharged to the voltage that is read out on the capacitor after being reset to determine time of flight information.

16. The time of flight sensing system of claim 14 wherein each one of the time of flight pixel cells further comprises an output switch coupled between the capacitor and the gate of the amplifier.

17. The time of flight sensing system of claim 14 wherein each one of the time of flight pixel cells further comprises a row select switch coupled between an output of the amplifier and a bitline.

18. The time of flight sensing system of claim 17 further comprising read out circuitry coupled to read out the voltage from each one of the time of flight pixel cells through the bitline.

19. The time of flight sensing system of claim 18 further comprising time counters coupled to the read out circuitry to determine time of flight information for each light pulse that is emitted from the light source until the photosensor senses the respective one of the photons reflected from the object.

20. The time of flight sensing system of claim 19 further comprising function logic coupled to the time counters to store and process time of flight information read out from the time of flight pixel array.

21. The time of flight sensing system of claim 13 wherein the controllable current source is coupled to provide the charge current to the capacitor after each light pulse is emitted from the light source until the photosensor senses the respective one of the photons reflected from the object.

22. The time of flight sensing system of claim 13 wherein the controllable current source includes an alternate current path to conduct the charge current after the photosensor senses the respective one of the photons reflected from the object until a next light pulse is emitted from the light source.

23. The time of flight sensing system of claim 13 wherein the voltage on the capacitor scaled by the plurality number of times that the voltage on the capacitor is charged by the controllable current source is representative of the round trip distance to the object.

24. The time of flight sensing system of claim 13 wherein a first voltage is coupled to be read out from the capacitor that is coupled to be charged by the controllable current source in response to light pulses that are emitted at a first frequency from the light source,
wherein a second voltage is coupled to be read out from the capacitor that is coupled to be charged by the controllable current source in response to light pulses that are emitted at a second frequency from the light source, and
wherein a compensated round trip distance to the object is determined in response to the first voltage, the second voltage, a first maximum range of the light pulses that are emitted at the first frequency from the light source, and a second maximum range of the light pulses that are emitted at the second frequency from the light source.

25. The time of flight sensing system of claim 24 wherein the compensated round trip distance to the object compensates for photons reflected from the object that are undetected.

26. The time of flight sensing system of claim 13 wherein the photosensor comprises a single photon avalanche diode (SPAD).

27. A method of determining a round trip distance to an object utilizing time of flight, the method comprising:
emitting light pulses to an object from a light source at a first frequency;
charging a capacitor in response to the light pulses being emitted from the light source at the first frequency;
sensing photons reflected from the object;
discontinue charging the capacitor in response to the sensing of the photons reflected from object;
measuring a first voltage on the capacitor after the capacitor is charged a plurality of n times in response to the light pulses being emitted from the light source at the first frequency; and
determining a round trip distance to the object in response to the first measured voltage on the capacitor.

28. The method of determining the round trip distance to the object of claim 27 further comprising scaling the first measured voltage on the capacitor by the plurality of n times that the capacitor is charged.

29. The method of determining the round trip distance to the object of claim 27 further comprising resetting the capacitor and recharging the capacitor to the first measured voltage to determine time of flight information for the round trip distance to the object.

30. The method of determining the round trip distance to the object of claim 27 further comprising:
resetting the capacitor;
emitting light pulses to the object from the light source at a second frequency;
charging the capacitor in response to the light pulses being emitted from the light source at the second frequency;
sensing photons reflected from the object;
discontinue charging the capacitor in response to the sensing of the photons reflected from object;
measuring a second voltage on the capacitor after the capacitor is charged a plurality of n times in response to the light pulses being emitted from the light source at the second frequency; and
determining a compensated round trip distance to the object in response to the first measured voltage on the capacitor, the second measured voltage on the capacitor, a first maximum range of the light pulses being emitted from the light source at the second frequency, and a second maximum range of the light pulses being emitted from the light source at the second frequency.

31. The method of determining the round trip distance to the object of claim 30 wherein the determining of the compensated round trip distance to the object comprises compensating for photons reflected from the object that are undetected.

\* \* \* \* \*